(12) United States Patent
Harris et al.

(10) Patent No.: US 11,340,333 B1
(45) Date of Patent: May 24, 2022

(54) SYSTEMS AND METHODS FOR IMPROVED TRACK ACCURACY FOR MULTIPLE TARGETS

(71) Applicant: Reservoir Labs, Inc., New York, NY (US)

(72) Inventors: Mitchell Harris, New York, NY (US); Paul D. Mountcastle, Moorestown, NJ (US); Aditya Gudibanda, Jersey City, NJ (US)

(73) Assignee: Reservoir Labs, Inc., New York, NY (US)

( * ) Notice: Subject to any disclaimer, the term of this patent is extended or adjusted under 35 U.S.C. 154(b) by 499 days.

(21) Appl. No.: 16/451,701

(22) Filed: Jun. 25, 2019

Related U.S. Application Data

(60) Provisional application No. 62/689,516, filed on Jun. 25, 2018.

(51) Int. Cl.
*G01S 7/40* (2006.01)
*G06N 7/00* (2006.01)

(52) U.S. Cl.
CPC ............... *G01S 7/40* (2013.01); *G06N 7/005* (2013.01)

(58) Field of Classification Search
CPC .................................. G01S 7/40; G06N 7/005
See application file for complete search history.

(56) References Cited

U.S. PATENT DOCUMENTS

| | | | | |
|---|---|---|---|---|
| 5,798,942 A * | 8/1998 | Danchick | ............... | G01S 3/7864 |
| | | | | 342/36 |
| 8,581,776 B2 * | 11/2013 | Tsunekawa | ............. | G01S 13/58 |
| | | | | 342/70 |
| 9,135,816 B2 * | 9/2015 | Chung | ..................... | G08G 1/04 |
| 10,106,154 B2 * | 10/2018 | Nguyen Van | ........ | G05D 1/0238 |
| 10,466,349 B2 * | 11/2019 | Baskaran | ............. | G01S 13/723 |
| 11,061,130 B2 * | 7/2021 | Fujitsu | ..................... | G01S 7/352 |
| 2011/0098922 A1 * | 4/2011 | Ibrahim | ................ | B60W 50/10 |
| | | | | 701/532 |
| 2019/0258269 A1 * | 8/2019 | Yanagihara | .......... | G05D 1/0289 |

OTHER PUBLICATIONS

Hyland et al. ,A Multi-hypothesis Filter for Passive Tracking of Surface and Sub-Surface Target Localizatio, IEEE (Year: 2006).*
Chang et al. ,Application of State Estimation to Target Tracking, IEEE (Year: 1984).*

\* cited by examiner

*Primary Examiner* — Mohammad K Islam
(74) *Attorney, Agent, or Firm* — Seyfarth Shaw LLP

(57) ABSTRACT

In an apparatus for determining the state of a system in which several system components undergo respective changes simultaneously, sensor measurements obtained from the components and candidate paths representing the individual states of the different components are analyzed. In this analysis, the system state is modeled in terms of likelihoods that certain paths correspond to true parameterized paths representing individual states of the system components and likelihoods that certain observations are associated with certain components. An optimization of the model provides accurate values of each type of likelihood, which then indicate the likely state of the system.

30 Claims, 9 Drawing Sheets

(8 of 9 Drawing Sheet(s) Filed in Color)

SYSTEMS AND METHODS FOR IMPROVED TRACK ACCURACY FOR MULTIPLE TARGETS

CROSS-REFERENCE TO RELATED APPLICATIONS

This application claims benefit of priority to U.S. Provisional Patent Application Ser. No. 62/689,516 entitled "Systems and Methods for Improved Track Accuracy for Multiple Ballistic Targets," filed on Jun. 25, 2018, the entire contents of which are incorporated herein by reference.

GOVERNMENT LICENSE RIGHTS

This invention was made with government support under contract No. HQ0147-17-C-7422 awarded by the U.S. Department of Defense—Missile Defense Agency. The government has certain rights in the invention.

FIELD OF THE INVENTION

This disclosure generally relates to apparatuses and methods for identifying the state of a system and, in particular, to identifying the state of a system in which more than one elements of the system are simultaneously undergoing a change, such as a system in which two or more objects are moving at the same time.

BACKGROUND

In many situations such as automatic maneuvering of airborne objects, underwater objects, objects in the outer space, and for surveillance of objects it is necessary not only to detect the presence of objects in a targeted region, but also to determine the respective motions of these objects. To this end, sensors or imaging devices such as high-resolution cameras, radars, lidars, etc. are used, and the raw sensor signals are processed to extract actionable knowledge, such as detection of an object of interest, such as a vehicle in a field, a satellite launched in an orbit, etc. Actionable knowledge or information of interest can also include determining whether and how an object may be moving, such as the speed and direction of a vehicle, how an object in space is tumbling or whether it has left an orbit, etc.

Often, significant amounts of data (e.g., tens or hundreds of megabytes, several gigabytes, or more) must be collected from the sensor and a large number of computations (e.g., hundreds, thousands, millions, billions, or more floating-point operations) must be performed on the collected data in order to extract useful, actionable information. As such, many sensor and associated data processing systems are bulky and costly, and they generally consume a lot of power. This problem becomes more challenging, if not infeasible to solve, when not just one but several objects undergoing respective changes simultaneously form a part of a system under observation. Also, it is often not known how many objects are included in the system and, as such, it is not known which sensor observations correspond to which objects. This further increases the difficulty of estimating the individual states of the different objects and determining the overall system state.

SUMMARY

In various embodiments, methods and systems described herein feature techniques that can determine the state of a system in which several objects are undergoing changes simultaneously, when the change in each object can be described as a parametric path, i.e., by using a fixed set of parameters. This is achieved, in part, by generating several candidate paths using the set of parameters. Each candidate path may represent an actual parametric path of some object that is part of a system for which the state is to be determined with certain probability $p_k^l$. In another set of probabilities, each probability $\omega_l^n$ represents the likelihood that a particular sensor observation corresponds to a particular object. The two sets of probabilities are computed simultaneously such that several subsets of probabilities in the first set of probabilities p can inform the likely path of each object in the system.

In general, the more the candidate paths, the greater the likelihood that one or more of those candidates may be designated high probabilities of likely representing a parameterized path of some object in the system. The large number of candidates in combination with hundreds, thousands, tens of thousands, millions, or even more sensor observations can, however, make the joint determination of two sets of probabilities challenging, if not infeasible. Therefore, the number of the candidate paths considered is selected, and is generally maximized, subject to specified performance and/or memory consumption constraints.

Examples of systems in which different objects that form the system undergo changes according to a fixed set of parameters include a system of ballistic objects, a fleet of vessels in an ocean, a fleet of autonomous and other vehicles on a highway, etc. Each of these objects may be moving at different speeds, in different directions, and in different manners, and the number of objects in a particular system may be unknown. The set of parameters can be spatial coordinates, a set of invariants defining an orbit, or another parameterized path.

Accordingly, in one aspect, a method is provided for estimating a state of a system having several objects, two or more of which are undergoing changes. The method includes receiving at a processor a set of actual measurements ($\hat{\theta}$) that is obtained using one or more sensors, and that is indicative of respective individual states of one or more of the plurality of objects. An individual state of an object represents a parametric change in a property of the object. For example, for a moving object, the property can be a location of the object at a certain time, and the individual state of the object can be a path along which the object is moving, where the path is defined by certain parameters.

The method also includes generating by a processing system a set of candidate paths. Each candidate path corresponds to a conjectured individual state of one of the several objects. A cardinality (K) of the set of candidate paths, i.e., the total number of candidate paths that are explored, is maximized based on a processing capacity or a memory capacity of the processing system. A set of conjectured measurements ($\theta$) for each candidate path in the set of candidate paths is also computed by the processing system.

The method further includes deriving using the set of actual measurements ($\hat{\theta}$) and the set of conjectured measurements ($\theta$), a first set of probabilities $\{p_k^l\}$ where a probability $p_k^l$ indicates that a k-th candidate path $q_k$ is a true path of an l-th object. The method also includes deriving, using the set of actual measurements ($\hat{\theta}$) and the set of conjectured measurements ($\theta$), a second set of probabilities $\{w_n^l\}$ where a probability $w_n^l$ indicates that an n-th measurement corresponds to the l-th object. The method further includes identifying based on, at least in part, the first set of probabilities $\{p_k^l\}$, first subset of candidate paths as likely paths of a first object from the several objects.

In some embodiments, a number of dimensions of a measurement in the set of actual measurements ($\hat{\theta}$) is less than a number of dimension of a candidate path in the set of candidate paths. In some embodiments, each candidate path in the set of candidate path is expressed in terms of a set of invariant coordinates. Deriving the first and second sets of probabilities may include minimizing an objective function based on the set of actual measurements ($\hat{\theta}$), the set of conjectured measurements ($\theta$), and the first and second sets of probabilities $\{p_k^l\}$ and $\{w_n^l\}$.

In some embodiments, minimizing the objective function includes: (i) holding the first set of probabilities $\{p_k^l\}$ fixed and allowing one or more of the second set of probabilities $\{w_n^l\}$ to change, so as to minimize a value of the objective function. Minimizing the objective function may further include: (ii) holding the second set of probabilities $\{w_n^l\}$ fixed and allowing one or more of the first set of probabilities $\{p_k^l\}$ to change, so as to minimize a value of the objective function. The method may further include iteratively alternating between steps (i) and (ii) until either the first and the second set of probabilities converges, or until a preselected number of iterations is performed. Either step (i) may be performed first, followed by step (ii), in a first iteration, or step (ii) is performed first, followed by step (i), in the first iteration.

In some embodiments, minimizing the objective function includes: (i) holding the first set of probabilities $\{p_k^l\}$ fixed and (ii) iteratively holding all but one of the second set of probabilities $\{w_n^l\}$ fixed and computing, using a closed-form expression, a particular probability $w_n^l$ that is not held fixed, a different $w_n^l$ not being held fixed and being computed in each successive iteration. In these embodiments, the method also includes: (iii) holding the second set of probabilities $\{w_n^l\}$ fixed, and (iv) iteratively holding all but one of the first set of probabilities $\{p_k^l\}$ fixed and computing using a closed-form expression a particular probability $p_k^l$ that is not held fixed, where a different $p_k^l$ is not held fixed and is computed in each iteration, so as to minimize a value of the objective function. The steps (i) and (ii) may be performed before the steps (iii) and (iv) or steps (iii) and (iv) may be performed before steps (i) and (ii).

In some embodiments, the several objects that form the system of which the state is to be determined include a number of moving objects. For each object, the corresponding individual state represents a parametric path of movement of the object, and the set of actual measurements ($\hat{\theta}$) is indicative of respective movements of one or more of the several objects. The method may further include: obtaining for the several objects, a set of initial observation pairs, where each observation pair includes an estimated initial position (r) of a moving object and an initial velocity (v) of the moving object. The association between the pairs and the several objects is unknown. In addition, the method may include generating the set of candidate paths ($\{q_k\}$) by applying a Kalman filter or an extended Kalman filter to the set of initial observation pairs.

In some embodiments, the method includes clustering the set of actual measurements ($\hat{\theta}$) to determine an upper bound on the number of objects, and generating the set of candidate paths ($\{q_k\}$) may include sequentially applying the Kalman filter to each cluster along with the set of initial observation pairs.

A measurement in the set of actual measurements ($\hat{\theta}$) may include one or more of: a range of an object from a sensor, a rate of change of range of an object from the sensor, an angle of an object relative to the sensor, brightness of an object, or Doppler shift associated with an object. A sensor may include a radar, a lidar, an electro-optical sensor, an infra-red sensor, a Doppler radar, a double Doppler radar, or an optical sensor.

In another aspect, a computing apparatus is provided for estimating a state of a system having several objects, two or more of which are undergoing changes. The apparatus includes a first processor and a first memory in electrical communication with the first processor. The first memory includes instructions that can be executed by a processing unit including the first processor or a second processor, or both. The processing unit may be in electronic communication with a memory module that includes the first memory or a second memory or both.

The instructions in the first memory program the processing unit to: receive a set of actual measurements ($\hat{\theta}$) that is obtained using one or more sensors, and that is indicative of respective individual states of one or more of the several objects. An individual state of an object represents a parametric change in a property of the object. The instructions also program the processing unit to generate a set of candidate paths and a set of conjectured measurements ($\theta$) for each candidate path in the set of candidate paths. Each candidate path corresponds to a conjectured individual state of one of the several objects. A cardinality (K) of the set of candidate paths, i.e., the total number of candidate paths that are explored, is maximized based on a processing capacity or a memory capacity of the processing unit.

The instructions also program the processing unit to derive using the set of actual measurements ($\hat{\theta}$) and the set of conjectured measurements ($\theta$), a first set of probabilities $\{p_k^l\}$ and a second set of probabilities $\{w_n^l\}$, where a probability $p_k^l$ indicates that a k-th candidate path $q_k$ is a true path of an l-th object, and a probability $w_n^l$ indicates that an n-th measurement corresponds to the l-th object. Moreover, the instructions program the processing unit to identify based on, at least in part, the first set of probabilities $\{p_k^l\}$, a first subset of candidate paths as likely paths of a first object from the several objects. In various embodiments, the instructions can program the processing unit to perform one or more of the method steps described above.

In another aspect, an article of manufacture is provided that includes a non-transitory storage medium having stored therein instructions which, when executed by a processing unit program the processing unit, which is in electronic communication with a memory module, to for estimate a state of a system having several objects, two or more of which are undergoing changes. The instructions may program the processing unit to receive a set of actual measurements ($\hat{\theta}$) that is obtained using one or more sensors, and that is indicative of respective individual states of one or more of the several objects. An individual state of an object represents a parametric change in a property of the object. The instructions also program the processing unit to generate a set of candidate paths and a set of conjectured measurements ($\theta$) for each candidate path in the set of candidate paths. Each candidate path corresponds to a conjectured individual state of one of the several objects. A cardinality (K) of the set of candidate paths, i.e., the total number of candidate paths that are explored, is maximized based on a processing capacity or a memory capacity of the processing unit.

The instructions also program the processing unit to derive using the set of actual measurements ($\theta$) and the set of conjectured measurements ($\theta$), a first set of probabilities $\{p_k^l\}$ and a second set of probabilities $\{w_n^l\}$, where a probability $p_k^l$ indicates that a k-th candidate path $q_k$ is a true path of an l-th object, and a probability $w_n^l$ indicates that an n-th measurement corresponds to the l-th object. Moreover, the instructions program the processing unit to identify based on, at least in part, the first set of probabilities $\{p_k^l\}$, a first subset of candidate paths as likely paths of a first object from the several objects. In various embodiments, the instructions can program the processing unit to perform one or more of the method steps described above.

BRIEF DESCRIPTION OF THE DRAWINGS

The patent or application file contains at least one drawing executed in color. Copies of this patent or patent application publication with color drawing(s) will be provided by the Office upon request and payment of the necessary fee. In the following description, various embodiments of the present invention are described with reference to the following drawings, in which.

DETAILED DESCRIPTION

Multiple Target Tracking

Figure 1:
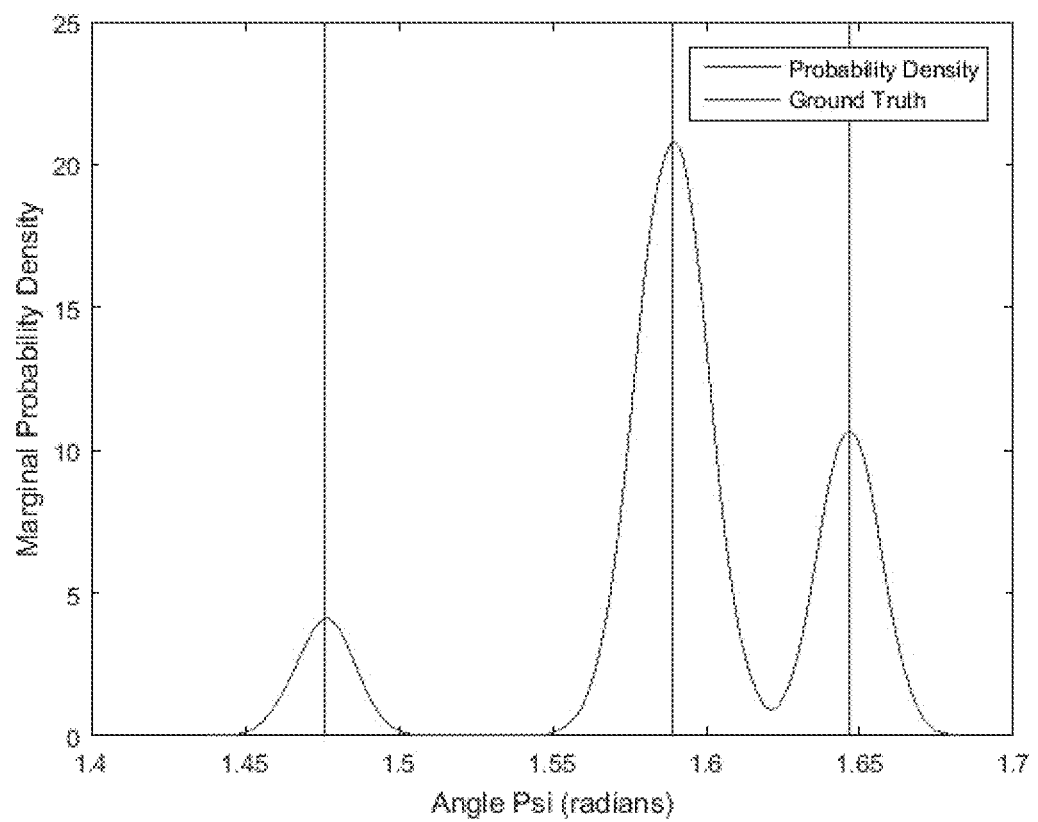
FIG. 1 shows subsets of probabilities of a parameter (orbital angle) of candidate paths of three ballistic objects, generated using an embodiment of a multi-target tracking process.

In various embodiments, we present a new technique for tracking two or more ballistic targets on the basis of sensor measurements acquired at a known set of track update times. This technique is a significant improvement over the single track technique that was described and claimed in U.S. patent application Ser. No. 14/987,240, entitled "Systems and Methods for Efficient Targeting," published as U.S. 2018/0106898A1, the entire contents of which are incorporated herein by reference. Not only can the new technique handle multiple targets, it does so in a way that combines measurement-to-track association and tracking into a fast unified optimization process. The technique generally applies to sensors of different types (e.g. range-only radars, electro-optical, infra-red, 3D radar, Doppler radar, double Doppler radar, etc.), and provides a unique capability for performing multi-sensor track fusion.

In the case of multiple tracks, the measurements are presented to the tracking system as an unlabeled batch, not associated with the corresponding individual targets. The resulting measurement-to-track association problem is often considered to be combinatorial in nature and computationally difficult. Our approach differs from popular multiple hypothesis tracking approaches by simultaneously developing a multimodal probability density function over the space of ballistic invariants (the multi-target track), along with a separate measurement-to track association likelihood function. These two probability functions appear as factors in a fast unified multiconvex optimization process. The optimization process we employ is based on measurement-constrained entropy maximization.

In some embodiments, six parameters q may be used to characterize the motion of a single target throughout the exo-atmospheric phase of flight. These include two parameters that describe the shape of the elliptical orbit, three parameters that define the orientation of the orbit in inertial space, and one parameter that provides the time at which the target achieves apogee, as measured by a reference clock. In a practical case, the reference time may be expressed relative to Greenwich Mean Time (GMT). The goal of tracking in the ballistic invariant framework is to estimate the parameters corresponding to all of the targets in a multi-target scene, given a batch of sensor measurements that are not initially associated with any particular targets.

It is good to note that our tracking technique is not specific to radar range measurements, but can accommodate any sensor measurement that is a function of the target location, meaning any function of the track invariants and time. Examples of measurements that can be employed in a tracking system according to various embodiments include focal-plane measurements from electro-optical sensors, target angles from monopulse or a phased array radar antenna, radial velocity (Doppler shift), and more exotic measurements obtained via signal processing such as radial acceleration.

Not only is the tracking technique able to handle different kinds of sensor measurements without modification, it is possible to mix measurements from separate sensors using different phenomenologies into a single, unified multi-track optimization process, provided only that the measurements can be made available to a central track processor. This advantage stems from the fact that the tracks are expressed in an invariant system of coordinates that do not depend on the geometry of the sensor.

To describe the overall process, we first suppose that the space of ballistic invariants is sampled at a high enough density that the samples adequately cover the invariant space near the true track invariants. For computational reasons, e.g., to perform multi-target tracking under constraints such as available processing capacity (which may be expressed in terms of available CPU time or CPU cycles) and/or available memory, it is necessary to focus the sampling on the likeliest regions in the invariant or parametric space of the system for which the state is to be determined.

In various embodiments, we start with an initial estimate of the position and velocity in the form of a handover track: the position, velocity, and the covariance of position and velocity at a reference time. Together, these give us six dimensions that are converted into the invariant space. The six dimensions in conventional state space are 3 dimensions of both position and velocity, (r, v). The six parameters or dimensions of invariant space are described in Table 1.

TABLE 1

Invariant (q) space dimensions

| | Invariant | # of parameters | Dimension |
|---|---|---|---|
| E | Energy | 1 | $\frac{m^2}{s^2}$ |
| L | Angular momentum | 1 | $\frac{m^2}{s}$ |
| [EO] | Orientation of orbit | 3 | orthogonal matrix |
| $t_A$ | Time of apogee | 1 | s |

The conversions between invariant space q and conventional state space play an important role in the overall process. Given a time t and the invariants q we can compute the conventional state vector (r, v). Given the conventional state vector (r, v) and a time t, we can compute q.

Table 2 summarizes all of the notation that will be used in the multi-target tracking system/process according to various embodiments. In all instances, the lower case letter (e.g. l) is an index for the corresponding upper case letter (e.g. L) that counts the total number of vector entries. When a sub or super-script of a variable is removed (e.g. when $p_k^l$ is written briefly as $p^l$), we mean the K-dimensional vector whose kth component is $p_k^l$.

TABLE 2

Summary of variable definitions

| Variable | Description |
|---|---|
| L | total number of ballistic targets |
| K | total number of discrete points in invariant sample space |
| $q_k$ | particular set of 6 invariants for the kth candidate invariant set |
| N | total number of measurements |
| $p_k^l$ | probability that $q_k$ is the true lth target |
| $w_l^n$ | probability that the nth measurement belongs to the lth target |
| $\hat{\theta}_n$ | the nth observation |
| $\theta_n^k$ | the hypothetical observation that would have been made had $q_k$ been the true track at the nth observation time |

In the single-track case, the quantities $\hat{\theta}_n$ are all measurements from the same target. In the multi-track case, we consider each measurement to have originated from one of L targets without knowing, however, from which particular target(s). At any time t we may receive measurements from some or all of the targets. Altogether, we make N observations, but the observations do not generally belong to every target. We would like to know which observations came from which target. This is the measurement-to-track association problem.

The output of the tracking system is an estimate for the probability density over the six dimensional invariant space, described by the probabilities assigned to each of the samples. Each mode (or "peak") in this probability distribution, which is by construction time-independent, denotes the presence of a target on the ballistic trajectory given by the six invariants q around the position of the peak. The density around the peak is a representation of our incomplete state of knowledge based on the batch of measurements. As described below, the likelihood that each measurement came from a particular target can also be regarded as a probability function subject to optimization alongside the probabilities that represent the multi-target track.

Denote each of the K sample points in the six-dimensional space of the ballistic trajectories by $q_k$. For each hypothesis $q_k$, we can calculate the measurement that would have been made by the sensor had a particular target actually been moving along that path. In one embodiment that uses range-only measurements from a radar, the measurements are the distances between the radar and the location of a target on ballistic orbit $q_k$ at the time of the track update that gave rise to the measurement.

We can organize these simulated or conjectured measurements into a matrix θ. If there are N measurement times, θ has dimension N×K, where $\theta_n^k$ is the measurement from the nth time for trajectory with parameters $q_k$. We let $p_k^l$: k∈{1K} denote the probability that the invariant set $q_k$ is a true set of trajectory parameters, $q_0^l$. We let $\hat{\theta}$ be the N-dimensional column vector whose nth component, $\hat{\theta}_n$, is the true measurement made at the nth time.

Internally to the optimization process, we use an index l to keep track of individual track numbers. As such, we use $p_k^l$ to denote the probability that $q_k$ is the lth true track $q_0^l$. We define:

$$p = \frac{1}{L} \sum_{\ell=1}^{L} p^{\ell}, \qquad (1)$$

where the sum is taken component-wise. It is beneficial to have some idea of the number of tracks, L. The optimization process converges when we choose L greater than the true number of tracks, as long as L is at least equal to the number of true tracks. An upper bound on L may be supplied by a user or can be derived as discussed below.

For each of the n observations, we denote the likelihood that it was taken from track l by $w_l^n$. In the ideal case, for each n, exactly one of $w_1^n$, $w_2^n$, ..., $w_L^n$ would be 1 and the rest 0. That would be a certain assignment of each observation to a target.

We apply the principal of maximum entropy to compute the probabilities. We write the objective function to be minimized as:

$$-\sum_{\ell=1}^{L}\left[H(p^{\ell}) + \frac{1}{\alpha}\sqrt{\sum_{n=1}^{N}\left(\left(-\hat{\theta}_n + \sum_{k=1}^{K} p_k^{\ell}\theta_n^k\right)w_\ell^n\right)^2}\right], \qquad (2)$$

where H(X) is the entropy of the distribution X, and $\alpha^{-1}$ is a multiplier that determines the relative strength of the two competing terms in the optimization. The quantity α has the same physical units as the measurement, and so makes the second term dimensionless, as required by the optimization process. Heuristics for the choice of a in the general case are discussed below. The optimization processes in different embodiments are subject to the constraints that entries of p and w are non-negative $$\sum_{k=1}^{K} p_k^{\ell} = 1 \text{ for all } \ell, \text{ and } \sum_{\ell=1}^{L} w_\ell^n = 1$$

for all n. These linear equations of constraint ensure that the quantities $p_k^l$ and $w_l^n$ qualify as probabilities.

The optimization is over two matrix variables: p and w. Holding either of these sets of variables constant yields a convex optimization problem in the other variable. This is the necessary condition for a multi-convex optimization problem. Problems of this type can be solved uniquely using, e.g., alternating convex projections. Therefore, to carry out such an optimization, we proceed by holding w fixed, find the optimal value of p; then hold p fixed, and find the optimal value of w. In some embodiments, when w are fixed, not all but only some subset of p are allowed to vary and the remaining subet of p remain fixed. Once the first subset of p computed, that subset is fixed and the other subset is allowed to vary. In the next iteration, all p are fixed, a first subset of w are fixed and the remaining second subset of w are allowed to vary and are computed. Thereafter, the second subset of w are fixed and the first subset of w are computed.

We repeat this sequence of alternating projections a fixed number of times, or until a specified error criterion is achieved. The resulting probability estimate over the sample space (the multi-target track) is p, and the resulting estimate of the measurement-to-track assignment likelihoods are w.

Experiment: Application to 6D Scenario

The scenario we chose for demonstrating an embodiment of the multi-track technique included of unitary targets on three separate trajectories launched from closely-spaced launch points in southeast Asia, with a common impact point on the West coast of continental U.S. For the purpose of the experiment, the launch was simulated. All three of the trajectories were chosen to be minimum energy trajectories for the given ground ranges, which caused the energy of two of the trajectories to be very close. All of the targets were detected by a simulated X-band midcourse radar in Honolulu, during the time around apogee when they were all close in position and velocity. In this experiment, there were 601 total simulated measurements at a track update rate of 1 Hz, but it was assumed that only one target was detected at each update, corresponding to the range to one of the three targets chosen at random. The parameters for the three simulated trajectories are given in Table 3.

TABLE 3

Multi-track scenario parameters

|  | Trajectory 1 | Trajectory 2 | Trajectory 3 |
| --- | --- | --- | --- |
| number of invariant samples | 10,000 | 10,000 | 10,000 |
| launch latitude (° N) | 40.61 | 19.54 | 27.89 |
| launch longitude (° E) | 129.43 | 110.8 | 102.26 |
| impact latitude (° N) | 34.05 | 34.05 | 34.05 |
| impact longitude (° W) | 118.24 | 118.24 | 118.24 |
| radar latitude (° N) | 21.31 | 21.31 | 21.31 |
| radar longitude (° W) | 157.86 | 157.86 | 157.86 |
| first track observation (s after apogee) | −300 | −300 | −300 |
| last observation time (s after apogee) | 300 | 300 | 300 |
| handover r ball size (m) | 100 | 100 | 100 |
| handover v ball size (m/s) | 50 | 50 | 50 |
| track update rate (Hz) | 5 | 5 | 5 |
| error on radar (m) | 5 | 5 | 5 |

The number of candidate, conjectured paths that are evaluated by the optimization process, i.e., K, may be selected based on the estimated processing load as a function of K and/or estimated memory consumption as a function of K, subject to a processing capacity constraint and/or a memory capacity constraint. Either or both of these constraints may depend on a number of processors or processor cores available in a multi-processor/multi-core computing system. In general, the larger the K (i.e., the number of candidate paths explored) the greater the likelihood that at least one and possibly several of the candidate paths are designated high probabilities of being the true paths of some targets. On the other hand, the lager the K the greater the processing load and/or memory consumption, which may result in a performance degradation, or the optimization problem may even become infeasible, e.g., if the required memory exceeds the available memory. Therefore, in various embodiments, K is selected based on the processing capacity and/or memory capacity constraints such that the number of candidate paths is maximized without violating the performance constraints. Known techniques can be used estimate the processing load and/or the memory consuption by the optimization problem for a given value of K.

For foregoing experiment, we randomly sampled K=10, 000 positions and velocities around the initial estimate for each handover position and velocity from a Gaussian distribution from an assumed extended Kalman filter with mean and variance 100 m for distance components and 50 m/s for velocity components. This gave us a sampled representation of the region of the parameter space containing the three orbits. We then estimated probabilities for each of these K points in 6D invariant space. The parameters of the experiment represent the uncertainty cloud provided by a typical handover from another sensor.

At each iteration, the convex optimization problem was solved using a type of second order cone programming solver, i.e., splitting conic solver (SCS). For this experiment, a was taken to be $10^6$ m, i.e., the order of the radius of the earth. This value was chosen in order that the measurements appearing in the objective function would be of order unity.

The multi-target track that results from the optimization process is a discretely sampled probability density function (PDF) over six dimensions. For purposes of visualizing this function, we represented the marginal densities over each of the individual dimensions. These marginal densities can be considered histograms, but an ordinary histogram of the data has undesirable properties; it is sensitive to the bin size, and the result becomes skewed by the initial sampling of the six-dimensional space.

These difficulties were overcome for purposes of producing the marginal plots by using a continuous density estimator (a type of binless histogram) called a Kernel Density Estimator (KDE). specifically, we sampled points from the sample space $q_k$ with probability $p_k$. In some embodiments, the optimization does not always return $p_k$ that exactly sum to 1, so we normalized this vector first. From the resulting set, we constructed Gaussian kernel density estimators. These estimators are sums of small normal distributions with means at every sample point.

Figure 2:
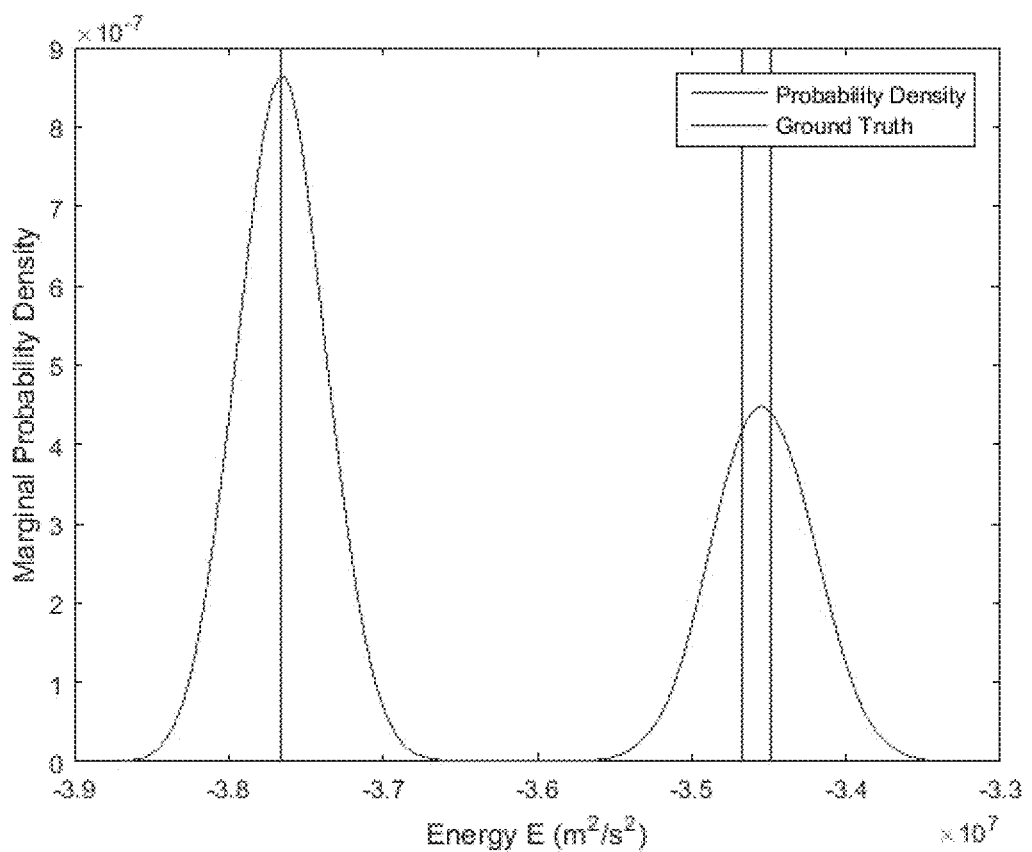
FIG. 2 shows subsets of probabilities of another parameter (energy) of the candidate paths of three ballistic objects, generated using an embodiment of a multi-target tracking process.

FIG. 1 shows the resulting marginal distribution over the angle ψ, the third Euler angle associated with the orientation of the orbit in earth-centered inertial coordinates. In FIG. 1, the marginal probability density for orbital angle ψ is plotted in blue; the true values of ψ for the three simulated tracks are shown in red. FIG. 2 shows the marginal probability density for orbital energy, where the probability density for energy is marked in blue; the true energies of the orbits are marked in red. FIG. 2 shows only two resolved peaks, indicating that targets 2 and 3 are not resolved in energy.

Figure 3:
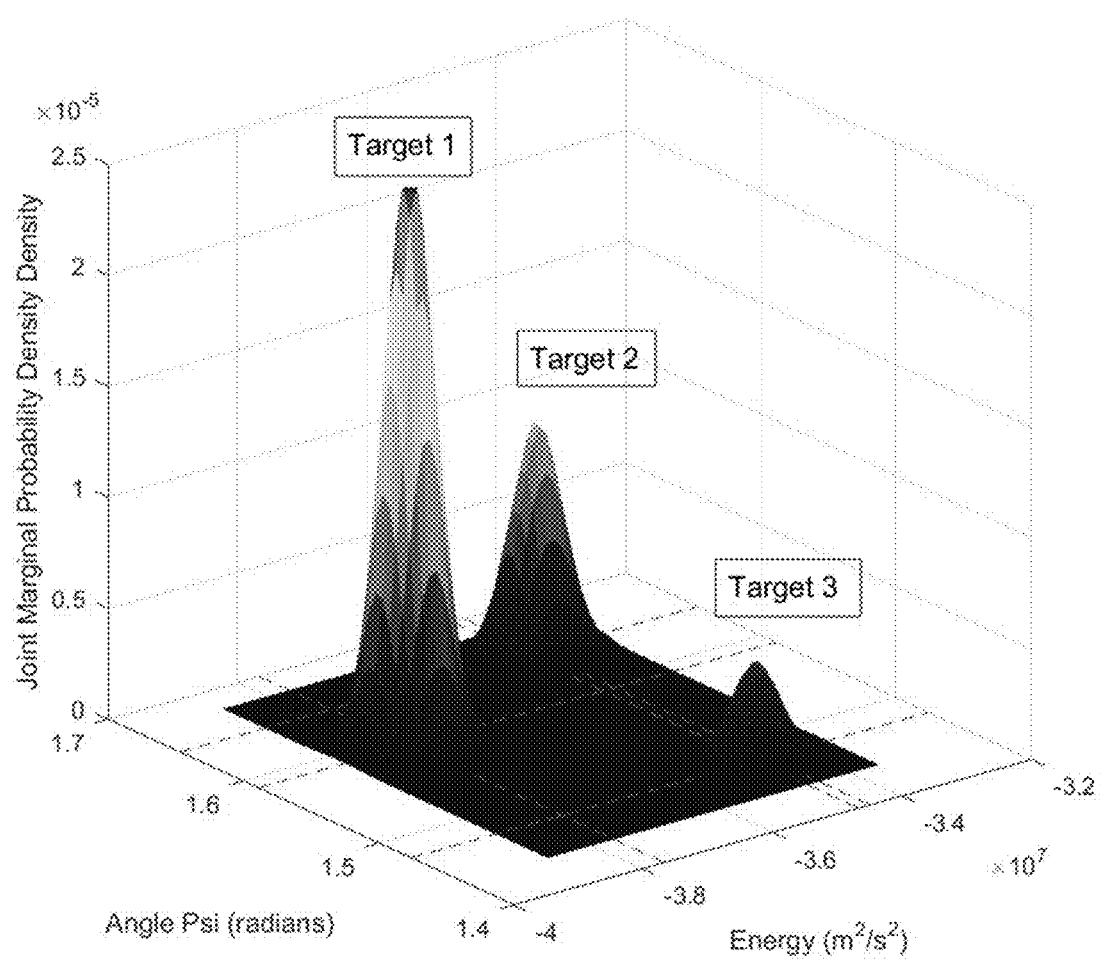
FIG. 3 jointly shows the subsets of probabilities of the two parameters (orbital angle and energy) shown in FIGS. 1 and 2, respectively.
Figure 4:
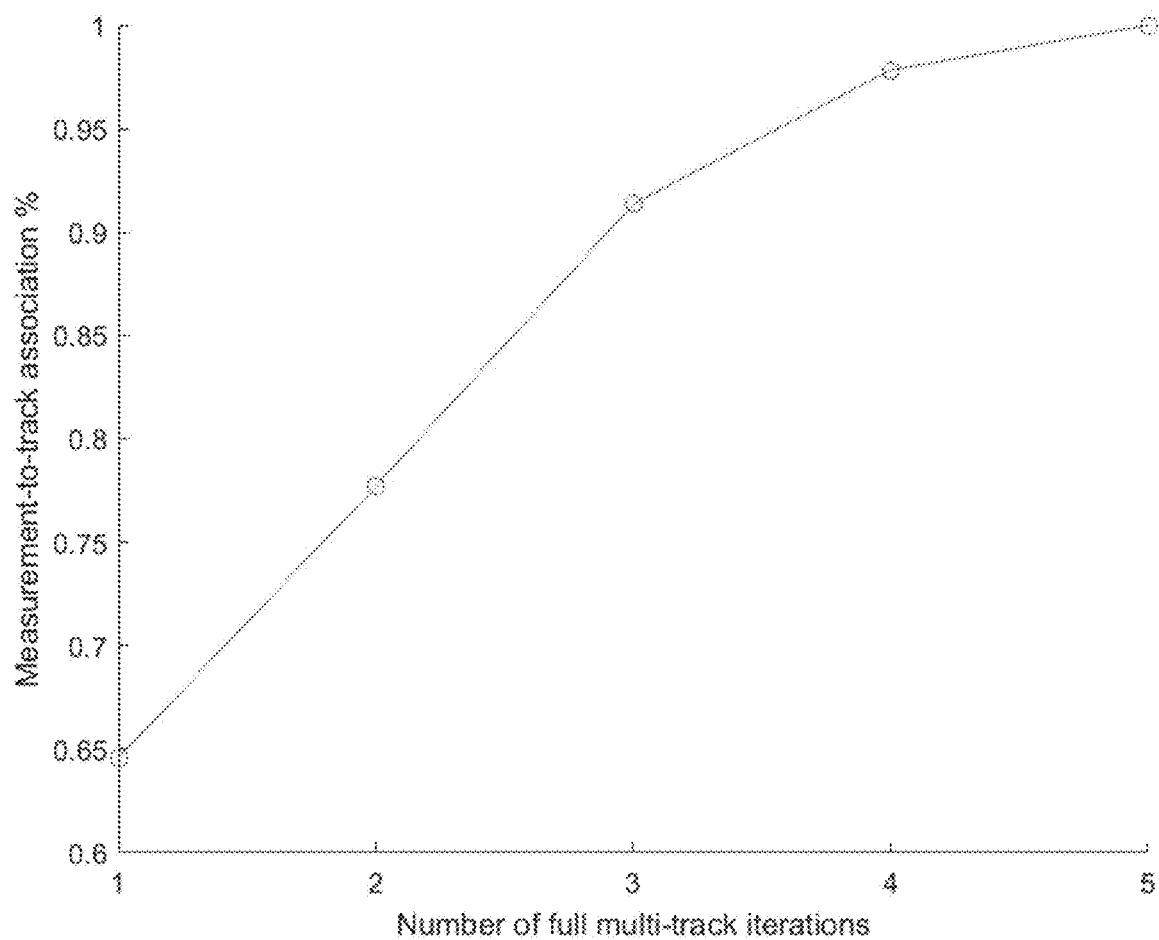
FIG. 4 shows improvement in track purity, i.e., the accuracy in probabilistic association between sensor observations and objects or their tracks, according to an embodiment of a multi-target tracking apparatus.

FIG. 3 shows the joint marginal probability density over orbital energy E and orbital angle ψ. This figure shows that the three target tracks are all well separated in the full space of ballistic invariants, despite the apparent confusion of targets 2 and 3 in the marginal plot of energy alone. In FIG. 3, the true ψ and energy are marked with red dotted lines; the surface represents the probability density estimate. The measurement-to-track likelihoods w provide an indication of which observations belong to which tracks. This likelihood can be compared with truth in simulation to calculate the track purity; the fraction of sensor measurements that were associated with the correct track. The increase in track purity as the optimization is performed can be seen in FIG. 4, which shows purity of tracks vs. the number of optimization iterations.

Computational Improvements: Fast Single Track Estimation

For a single track estimation, the optimization problem can be described as the maximization of the functional:

$$\mathcal{L}[p] = H[p] - E_p\left[\frac{\|\theta - \hat{\theta}\|_2^2}{\alpha^2}\right], \tag{3}$$

where $E_p[\cdot]$ denotes the expectation of its argument over the probability distribution p, and H[p] denotes the Shannon entropy of p, given by $$H[p] = -\sum_{k=1}^{K} p_k \ln p_k.$$

Equation 8 is a special case of the evidence lower bound (ELBO) objective that has an analytical solution given by:

$$p_k = A\exp\left(-\frac{\|\theta^k - \hat{\theta}\|_2^2}{\alpha^2}\right), \tag{4}$$

where "exp" denotes the exponential function, and the normalization factor A is chosen so that $$\sum_{k=1}^{K} p_k = 1,$$

as required. Eq. (4) educes to a normal distribution if the arguments $\theta^k$ vary linearly with the parameters q. In the case of ballistic tracking, they do not necessarily vary linearly with the six orbital invariants and track update times in a complicated way.

Figure 5:
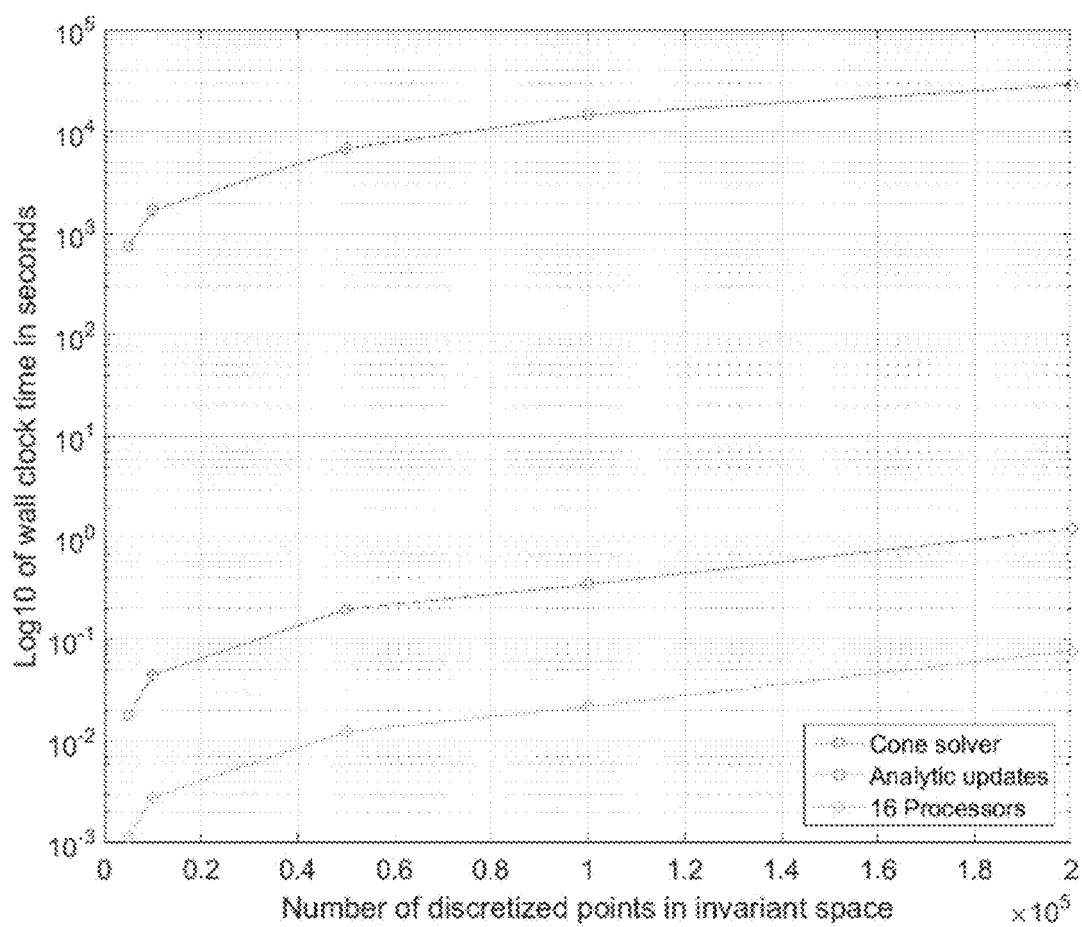
FIG. 5 shows the time of joint computation of the two sets of probabilities respectively associating candidate paths to system objects and sensor observations to system objects for each of three different embodiments of a multi-target tracking apparatus.

FIG. 5 illustrates the benefit in computational speed when the analytic update Eq. (4) is used in place of the second order cone solver (e.g., SCS) to carry out the convex optimization, as was previously done. Even when a single processor is used, the processing time decreases by three orders of magnitude, allowing the track determination under a stricter constraint on processing capacity expressed, e.g., in terms of CPU cycles or CPU time. Moreover, the analytical solution can be parallelized, resulting in further performance improvement using a multi-processor/multi-core computation system. FIG. 5 shows timing comparing the cone solver SCS on the original objective to the analytic update given in Eq. (4). System: Intel Xeon E5645 CPU, 12 GB RAM. Since the analytic updates are easily parallelized, notional times for the algorithm on 16 processors are also shown.

Computational Improvements: Fast Multi-Track Estimation

The multi-track objective function shown in Eq. (2) can be written as:

$$-\alpha^2 \sum_{\ell=1}^{L} H[p^\ell] - \sum_{n=1}^{N} H[w^n] + \sum_{\ell=1}^{L}\sum_{n=1}^{N}\sum_{k=1}^{K} \left(p_k^\ell (\theta_n^k - \hat{\theta}_n)^2 w_\ell^n\right) \tag{5}$$

where $H[\cdot]$ denotes the entropy functional as before. The minimum of this objective can be identified with the maximum of the ELBO function and computed analytically. As described earlier, holding one of p or w constant in successive iterations gives convex objectives in the other variable that is allowed to vary. Additionally, holding all but one $p^l$ constant is another convex objective, and holding all but one $w^n$ constant is an additional convex objective.

In some embodiments, on the iterations when we hold $w_l^n$ constant, we have the same form of solution as in Eq. (4), since the sum of entropies of the $w^n$ can be neglected. Hence if we also hold all but one $p^l$ constant, Eq. (5) becomes:

$$\sum_{\ell=1}^{L}\left(-H(p^\ell) + \frac{1}{\alpha^2}\sum_{n=1}^{N}\sum_{k=1}^{K} p_k^\ell(\theta_n^k - \hat{\theta}_n)^2 w_\ell^n\right) = \tag{6}$$

$$-H(p^\ell) + \frac{1}{\alpha^2}\sum_{n=1}^{N}\sum_{k=1}^{K} \left(p_k^\ell(\theta_n^k - \hat{\theta}_n)^2 w_\ell^n\right)$$

$$= -H(p^\ell) + \sum_{k=1}^{K} c_k^\ell p_k^\ell \tag{7}$$

$$= -H(p^\ell) + E_{p^\ell}(c^\ell) \tag{8}$$

where $$c_k^\ell = \frac{1}{\alpha^2}\sum_{n=1}^{N} (\theta_n^k - \hat{\theta}_n)^2 w_\ell^n.$$

As such, the optimal $p_k^l$ are given by:

$$p_k^\ell = A^\ell \exp\left(-\frac{1}{\alpha^2}\sum_{n=1}^{N} w_\ell^n(\theta_n^k - \hat{\theta}_n)^2\right) \tag{9}$$

where the constants $A^l$ are chosen so that each of the probabilities $p^l$ sums to 1. This computation is performed for each $p_k^l$ for all k=1 . . . K and for all l=1 . . . L. After normalizing the $p^l$, we then update the $w_l^n$. For the sake of that optimization, the entropy of p can be neglected. If we hold all but one $w^n$ constant, Eq. (5) becomes:

$$\sum_{n=1}^{N}\left(-H(w^n) + \sum_{\ell=1}^{L}\sum_{k=1}^{K} p_k^\ell(\theta_n^k - \hat{\theta}_n)^2 w_\ell^n\right) = \tag{10}$$

$$-H(w^n) + \sum_{\ell=1}^{L}\sum_{k=1}^{K} p_k^\ell(\theta_n^k - \hat{\theta}_n)^2 w_\ell^n$$

$$= -H(w^n) + \sum_{\ell=1}^{L} d_\ell^n w_\ell^n \tag{11}$$

-continued $$= -H(w^n) + E_{w^n}(d^n) \quad (12)$$
where $$d_\ell^n = \sum_{k=1}^{K} p_k^\ell (\theta_n^k - \hat{\theta}_n)^2.$$

Applying the analytic update formula a second time, we get:

$$w_\ell^n = B^\ell \exp\left(-\sum_{k=1}^{K} p_k^\ell (\theta_n^k - \hat{\theta}_n)^2\right). \quad (13)$$

where the normalization constants $B^\ell$ are chosen so that the $\Sigma_n w_l^n = 1$.

In some embodiments, we first initialize the $w_l^n$ to independent uniform random numbers between 0 and 1/L. At this first stage, there is no requirement that the probabilities add to 1. After the first iteration, they are all normalized appropriately. In each iteration, the computation of $w_l^n$ is performed for each $w_l^n$ for all l=1 . . . L and for all n=1 . . . N.

Example: Fast Multi-Track Algorithm in 2D Case

The output from the 6D case is difficult to visualize because of the high dimensionality of the space. To test the new objective, we considered the following equivalent problem in two dimensions. Let $x_1$, $x_2$, and $x_L$, be unknown points $\mathbb{R}^2$. In this example, the targets are stationary in a plane so that their paths (which would be positions) can be defined by (x, y) coordinates. We are given some known points, $t_1, t_2, \ldots t_N$ in the plane. For each $t_n$ we are given one measurement: $\hat{\theta}_n$, the distance between $t_n$ and any one of the $x_l$. We are not told from which $x_l$ the measurement is taken. We want to estimate the probability that a given set of points is one of the $x_l$.

Figure 6:
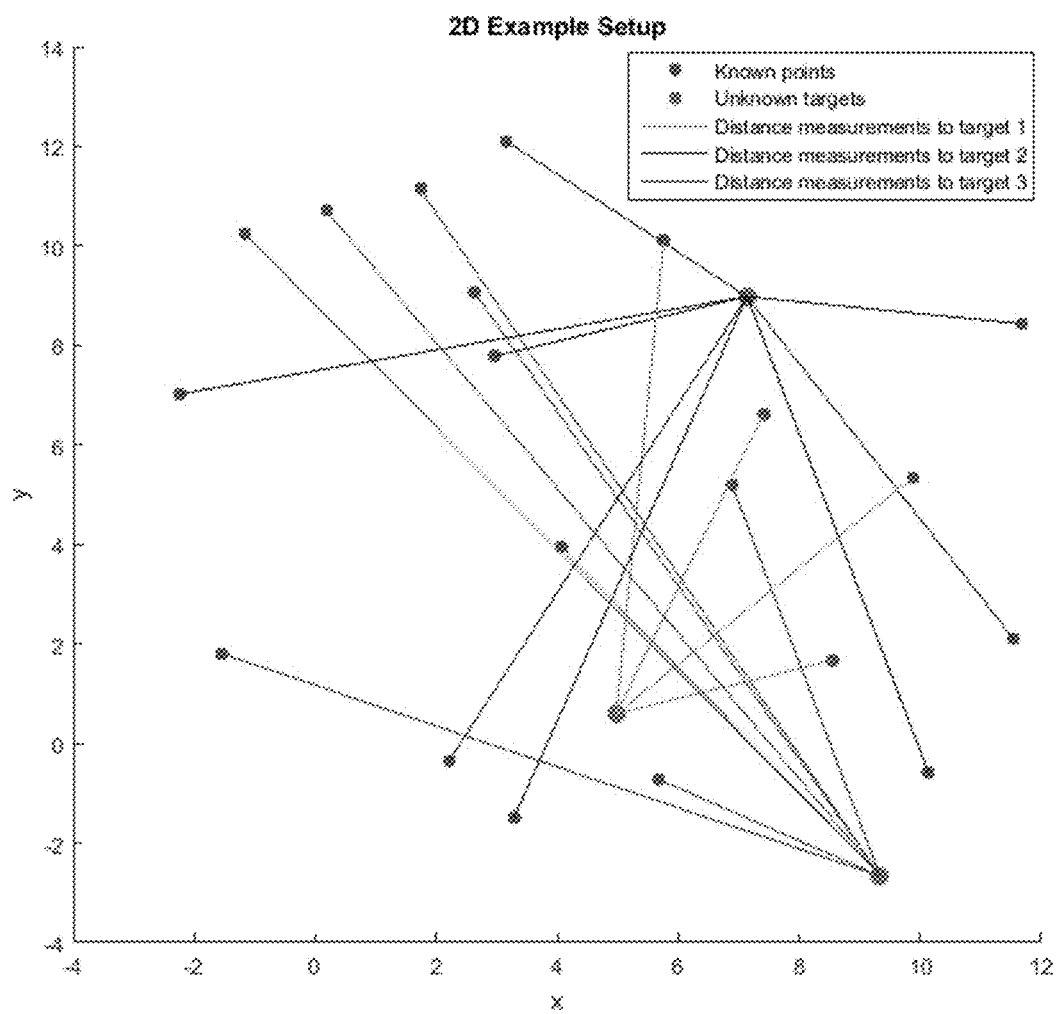
FIG. 6 shows tracking of several objects according to an embodiment of a multi-target tracking process, where the parametric paths are defined in a two-dimensional space.

FIG. 6 illustrates the setup of the 2D experiment. The red points represent the true values $x_l$ from several candidate targets in the 2D space of track invariants. The blue points, scattered at random known locations in the 2D state space, are analogous to track measurements taken at different times. The analogy is such that to each blue point, there corresponds one scalar measurement, namely the length of the line from that blue point to one of the targets. Exactly like in the full space of ballistic invariants, the measurement is a projection from a point in the full state space to a scalar quantity, so that one measurement provides information about the state of the target, but does not provide the full state of the target. In ballistic tracking, the scalar measurement is a sensor measurement (say a range or an angle measured from the sensor at a given track update time). It is a projective mapping from the state of the target into a measurement space.

We are only given the lengths (i.e. measurements), and not the colors of the lines (red, blue, and green), i.e., we do not know the true association between observations or measurements and targets. This is analogous to the corresponding situation in full ballistic multi-target tracking. The measurements arrive at the tracking system as an unordered batch, without any label as to which target corresponded to which measurement. An embodiment of the tracking system generates a probability density that indicates our state of knowledge regarding the locations of the targets in state space, based on the unlabeled batch of measurements. Not all of the points are included in FIG. 6. In our 2D simulation, there were eight targets instead of three, and 5000 total simulated sensor measurements instead of 20. Only three targets and only 20 measurements are shown in FIG. 6 for the sake of simplicity of depiction only.

We take an entire grid of 81×81 candidate points $q_1, \ldots, q_{6561}$. We construct the $\theta$ matrix of distances between each $q_k$ and the known points $t_1, \ldots, t_N$. Here, the $p_k$ are the probabilities that $q_k$ is one of the $x_l$, and $\theta_n$'s is the measurement of the distance from $q_k$ to the known point from which $\hat{\theta}_n$ is calculated. The $t_n$'s correspond to the time of measurements from the tracking problem in the sense that they are the known thing from which hypothetical positions from the tracks can be calculated.

Figure 7:
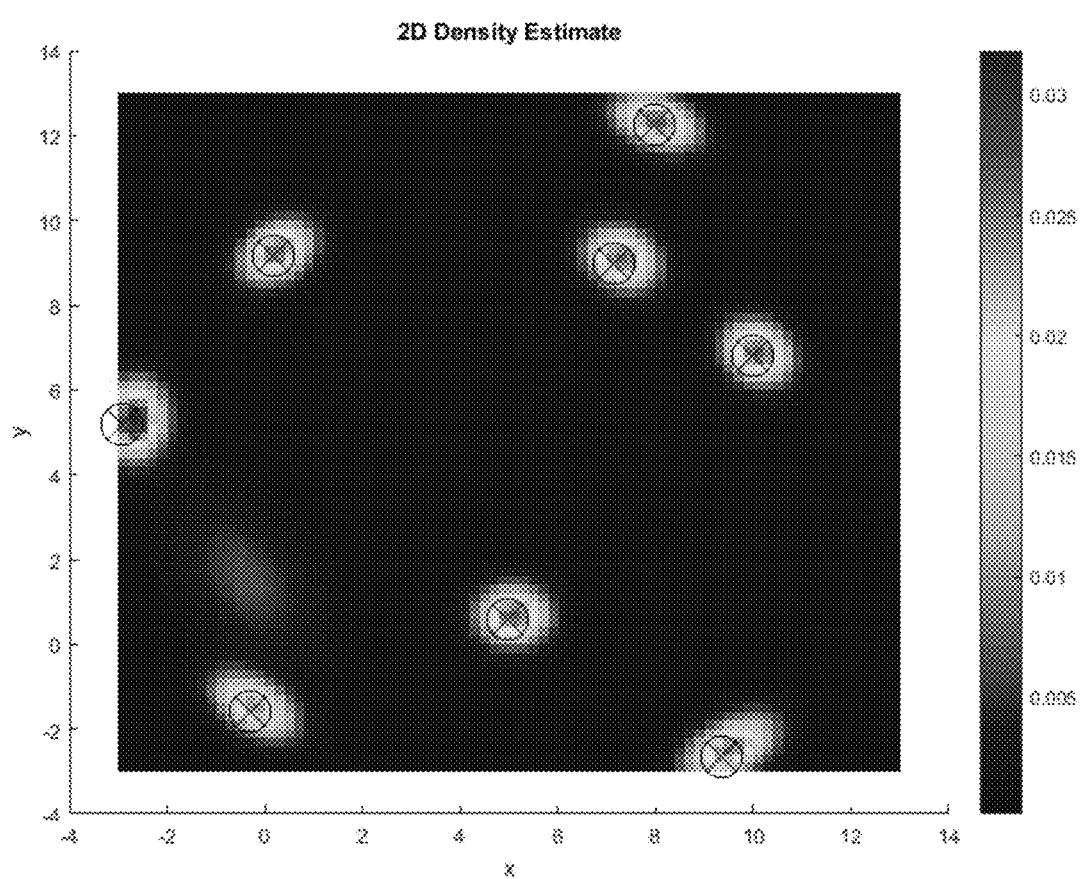
FIG. 7 shows subsets of probabilities of the two-parameter candidate paths shown in FIG. 6, where the probabilities were computed using an embodiment of a multi-target tracking process.

In our simulation we let there be 8 random points $x_l$ in the grid shown. The $t_n$ are 5000 points chosen with each coordinate randomly selected with uniform probability from [−3,13]. The $q_k$ are on the grid with lower left corner (−3, −3), upper right corner (13, 13), and step size 0.2. From this data we calculated $\theta$ and $\hat{\theta}$. An error was added to each d measurement from a normal distribution with standard deviation 0.01. Then we have enough to estimate a probability distribution over $q_k$ using an embodiment of a multi-target tracking process described above. We tell the algorithm that there may be 10 tracks and to use an $\alpha$ of 141, but nothing else. In FIG. 7, the probabilities sum to 10 (the number of estimated tracks). Therefore, we normalize the probabilities by 10, and not 8 (the true number of tracks), in order that the probability density in FIG. 7 sum becomes 1.0.

When the optimization is finished, we have an estimate for the probability density p at all of the points in the sample space. We plot those probabilities above those points. FIG. 7 shows the resulting probability density of the 2D example. Ground truth is at the center of the circles. From FIG. 7, we see that the peaks are exactly where we would expect. These results in the 2D case indicate that the objective scales well with more tracks.

Pre-Processing: Target Track Assignments

In some embodiments of a multiple-target tracking system, a preprocessing stage is provided that not only produces a good sampling in invariant or parametric space, but also (1) determines an upper bound on the number of distinct tracks observed during the measurements, and (2) provides an initial measurement-to-track association. These two functions are closely coupled, so in various embodiments they are performed together.

RANSAC is a technique for fitting a model through data points, a large proportion of which are noise. Instead of traditional outlier rejection techniques, RANSAC forms many models with the minimal number of points required to build the model. For instance, in a search for linear equations, RANSAC takes two points and fits a line. It then measures how effective that line is at describing the data. After choosing many random lines, the one that fits the highest proportion of the data is determined to be the correct line.

To this end, in RANSAC every measurement is generally marked with a standardized distance from the line. An indicator matrix is formed by taking $-e^{x/\tau}$ where x is the standardized distance and $\tau$ is a fixed scaling quantity. Each row in the indicator matrix corresponds to a hypothesis, and each column corresponds to a measurement. Agglomerative clustering is performed using the Tanimoto distance linkage function. The Tanimoto distance between two columns (corresponding to two detections) is calculated component-wise as:

$$d(p, q) = 1 - \frac{\langle p, q \rangle}{\|p\|^2 + \|q\|^2 - \langle p, q \rangle}.$$

Taking into account that the six invariants provide a parametric description of an orbit, in some embodiments, the RANSAC technique is used to obtain the needed initial association of measurements to tracks. While two detections or measurements (e.g., each including range and two angles) are sufficient to determine an orbit, the estimate from two points can be poor, due to the large uncertainty in the angular measurements. Therefore, in some embodiments we find the least squares fit of three points. While this lowers the probability that all of the points in the sample originated from the same track, it improves the quality of the hypotheses. We also measure the goodness of fit of a trajectory to a detection or sensor measurement by the sum of squared standard errors of the R, U, and V measurements. The model used for this fit is a Kepler or Vinti orbit in three-dimensional space.

The clustering provides an initial measurement to track association and also an upper bound on the number of tracks, i.e., an upper bound on L. In some embodiments the measurement in each cluster are used together with handoff measurements to generate a subset of candidate paths. This process is repeated for several or all clusters to general a complete set of candidate paths.

Figure 8:
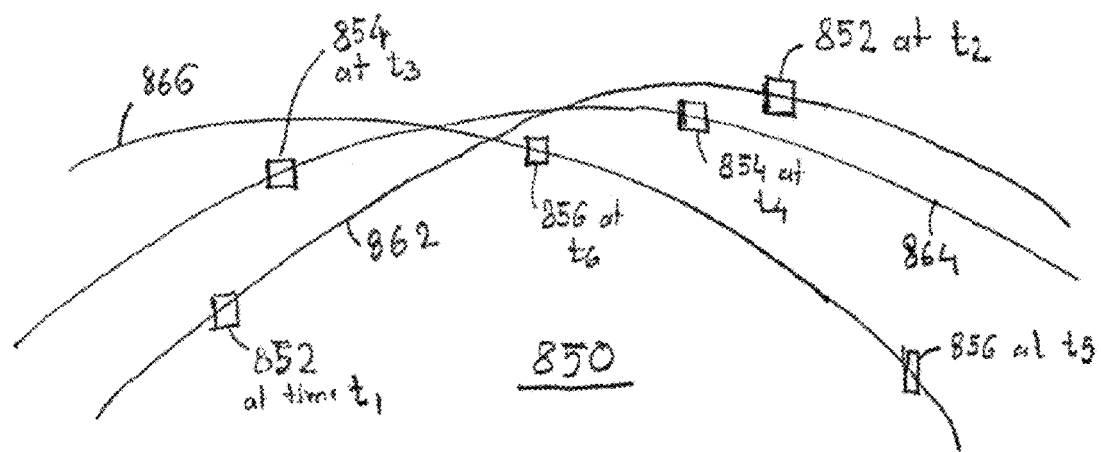
FIG. 8 schematically depicts an embodiment of a multi-target tracking apparatus and an example system of objects.
Figure 8:
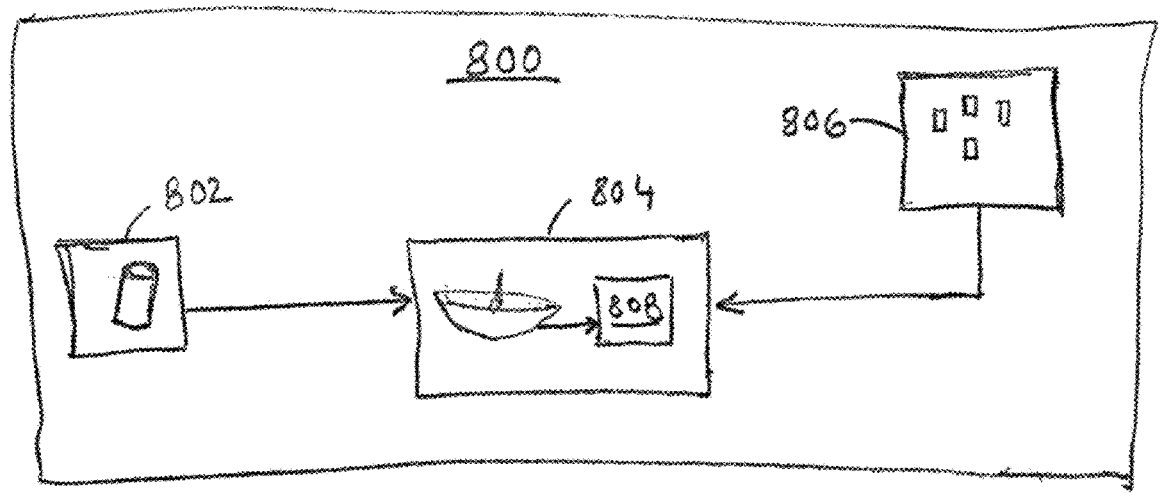

With reference to FIG. 8, a multiple-target tracking apparatus 800 includes three measurement stations 802, 804, 806. The use of three measurement stations is illustrative only. In general there can be as few as only one measurement station or several e.g., 5, 10, 30, or even more measurement stations. Each measurement station may include one or more sensors of the same of different kinds. The sensors used in different measurement stations can be of the same type or of different types such as radars, lidars, electro-optical sensors, infra-red sensors, etc. One or more of the measurement centers can provide the handover data.

In the apparatus 800, the measurement station 804 also includes a computing system 808 having known processing capacity and/or memory capacity, which can be applied as constraints in selecting the total number (K) of candidate paths to be explored. The computing system 808 receives the measurements from various different measurement stations. In some embodiments, a computing system need not be a part of a measurement station and can be a stand-alone system that receives measurements from various sensors. The computing system, such as the system 808, can be a single core or single processor system or a multi-core or multi-core processing system, facilitating parallel execution of some computations steps, as described above.

In general, an apparatus such as the apparatus 800 can obtain measurements from several elements of a system where the state of that system is to be determined. The apparatus 800 in particular is configured to obtain measurements from a system 850 of ballistic targets. The system 850 includes three targets 852, 854, 856, moving along respective paths 862, 864, 866. The objects may be located at different locations on their respective paths at different times. Measurements may be obtained, including handover measurements, at different times, when the objects have moved along their respective paths from one location to another, at different times. Two or more measurements can be, and typically are obtained at a particular time from two or more targets. As discussed above, these measurements do not readily reveal the target-path association, or even the actual number of targets.

Figure 9:
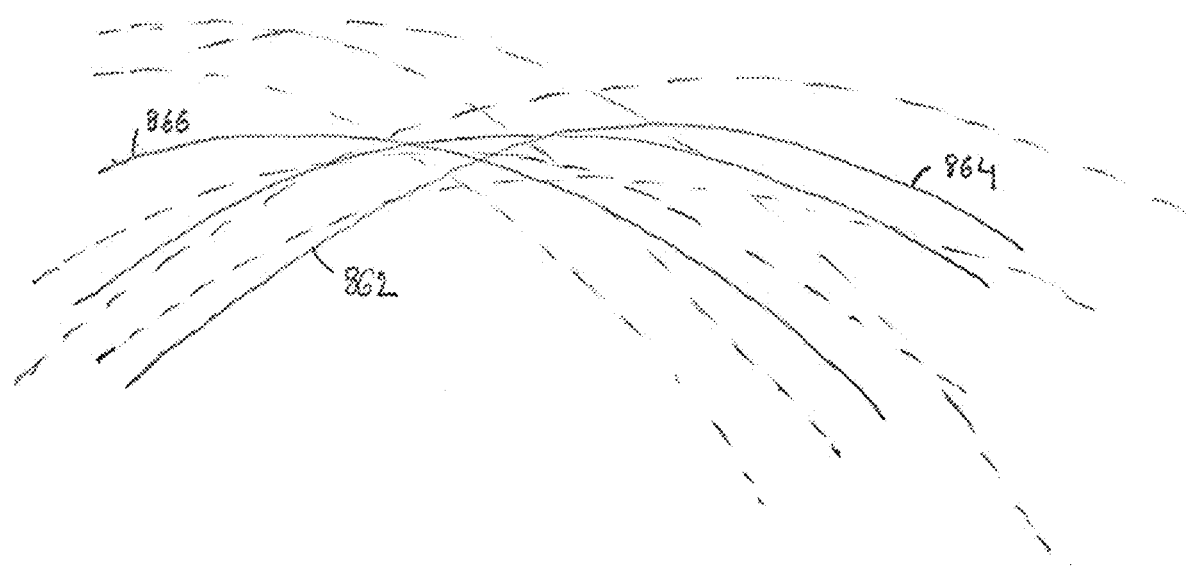
FIG. 9 schematically depicts some candidate paths of the objects of the example system shown in FIG. 8.

A system having ballistic targets is only an example of a system of which a state can be determined using the techniques described herein. In general, sensor measurements can be obtained from any system in which the actions of various system components, including movements of the system components, can be described using a parametric path. A path can be a physical trajectory or it can be a course of actions taken by a component. These measurements can be used to provide an association between the targets (i.e., system components) and likely path(s) of each of the components. FIG. 9 illustrates several candidate paths for the targets 852, 854, 856 as dashed lines.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A method for estimating a state of a system comprising a plurality of objects, the method comprising:
   receiving, by a processor, a set of actual measurements ($\hat{\theta}$) obtained using one or more sensors, and indicative of respective individual states of one or more of the plurality of objects, wherein an individual state of an object represents a parametric change in a property of the object;
   generating, by a processing system, a set of candidate paths, each candidate path corresponding to a conjectured individual state of one of the plurality of objects, and cardinality (K) of the set of candidate paths being maximized based on a processing capacity or a memory capacity of the processing system;
   computing, by the processing system, a set of conjectured measurements ($\theta$) for each candidate path in the set of candidate paths;
   deriving, by the processing system, using the set of actual measurements ($\hat{\theta}$) and the set of conjectured measurements ($\theta$): (i) a first set of probabilities $\{p\}$, a probability pk indicating that a k-th candidate path $q_k$ is a true path of an l-th object, and (ii) a second set of probabilities $\{wj\}$, a probability wn indicating that an n-th measurement corresponds to the l-th object; and
   identifying, by the processing system, based on, at least in part, the first set of probabilities $\{p_k\}$, a first subset of candidate paths as likely paths of a first object in the plurality of objects.

2. The method of claim 1, wherein a number of dimensions of a measurement in the set of actual measurements ($\hat{\theta}$) is less than a number of dimension of a candidate path in the set of candidate paths.

3. The method of claim 1, wherein each candidate path in the set of candidate path is expressed in terms of a set of invariant coordinates.

4. The method of claim 1, wherein deriving the first and second sets of probabilities comprises minimizing an objective function based on the set of actual measurements ($\hat{\theta}$), the set of conjectured measurements ($\theta$), and the first and second sets of probabilities $\{p_k^l\}$ and $\{w_n^l\}$.

5. The method of claim 4, wherein minimizing the objective function comprises:
   (i) holding the first set of probabilities $\{p_k^l\}$ fixed and allowing one or more of the second set of probabilities $\{w_n^l\}$ to change, so as to minimize a value of the objective function.

6. The method of claim 5, wherein minimizing the objective function comprises:
   (ii) holding the second set of probabilities $\{w_n^l\}$ fixed and allowing one or more of the first set of probabilities $\{p_k^l\}$ to change, so as to minimize a value of the objective function.

7. The method of claim 6, further comprises iteratively alternating between steps (i) and (ii) until:
   the first and the second set of probabilities converges; or
   a preselected number of iterations is performed.

8. The method of claim 7, wherein either step (i) is performed first, followed by step (ii), in a first iteration, or step (ii) is performed first, followed by step (i), in the first iteration.

9. The method of claim 4, wherein minimizing the objective function comprises:
  (i) holding the first set of probabilities $\{p_k^l\}$ fixed;
  (ii) iteratively holding all but one of the second set of probabilities $\{w_n^l\}$ fixed and computing using a closed-form expression a particular probability $\{w_n^l\}$ that is not held fixed, a different $w_n^l$ not being held fixed and being computed in each iteration;
  (iii) holding the second set of probabilities $\{w_n^l\}$ fixed; and
  (iv) iteratively holding all but one of the first set of probabilities $\{p_k^l\}$ fixed and computing using a closed-form expression a particular probability $p_k^l$, that is not held fixed, a different $p_k^l$, not being held fixed and being computed in each iteration, so as to minimize a value of the objective function.

10. The method of claim 9, wherein either steps (i) and (ii) are performed before steps (iii) and (iv) or steps (iii) and (iv) are performed before steps (i) and (ii).

11. The method of claim 1, wherein:
  the plurality of objects comprises a plurality of moving objects;
  for each object, the corresponding individual state represents a parametric path of movement of the object; and
  the set of actual measurements ($\hat{\theta}$) is indicative of respective movements of the one or more of the plurality of objects.

12. The method of claim 11, further comprising:
  obtaining for the plurality of objects, a set of initial observation pairs, each observation pair comprising an estimated initial position (r) of a moving object and an initial velocity (v) of the moving object, the association between the pairs and the plurality of objects being unknown; and
  generating the set of candidate paths ($\{q_k\}$) by applying a Kalman filter to the set of initial observation pairs.

13. The method of claim 12, further comprising:
  clustering the set of actual measurements ($\hat{\theta}$) to determine an upper bound on the number of objects; and
  generating the set of candidate paths ($\{q_k\}$) comprises sequentially applying the Kalman filter to each cluster along with the set of initial observation pairs.

14. The method of claim 1, wherein a measurement in the set of actual measurements ($\hat{\theta}$) comprises one or more of: a range of an object from a sensor, a rate of change of range of an object from the sensor, an angle of an object relative to the sensor, brightness of an object, or Doppler shift associated with an object.

15. The method of claim 1, wherein one of the one or more sensors comprises a radar, a lidar, an electro-optical sensor, an infra-red sensor, a Doppler radar, a double Doppler radar, or an optical sensor.

16. An apparatus for estimating a state of a system comprising a plurality of objects, the apparatus comprising:
  a first processor; and
  a first memory in electrical communication with the first processor, and comprising instructions that when executed by a processing unit that comprises the first processor or a second processor, and that is in electronic communication with a memory module that comprises the first memory or a second memory, program the processing unit to:
    receive a set of actual measurements ($\hat{\theta}$) obtained using one or more sensors, and indicative of respective individual states of one or more of the plurality of objects, wherein an individual state of an object represents a parametric change in a property of the object;
    generate a set of candidate paths, each candidate path corresponding to a conjectured individual state of one of the plurality of objects, and cardinality (K) of the set of candidate paths being maximized based on a processing capacity or a memory capacity of the processing system;
    compute a set of conjectured measurements ($\hat{\theta}$) for each candidate path in the set of candidate paths;
    derive using the set of actual measurements ($\hat{\theta}$) and the set of conjectured measurements ($\theta$): (i) a first set of probabilities $\{p_k^l\}$, a probability $p_k^l$ indicating that a k-th candidate path $q_k$ is a true path of an l-th object, and (ii) a second set of probabilities $\{w_n^l\}$, a probability $w_n^l$ indicating that an n-th measurement corresponds to the l-th object; and
    identify based on, at least in part, the first set of probabilities $\{p_k^l\}$, a first subset of candidate paths as likely paths of a first object in the plurality of objects.

17. The apparatus of claim 16, wherein a number of dimensions of a measurement in the set of actual measurements ($\hat{\theta}$) is less than a number of dimension of a candidate path in the set of candidate paths.

18. The apparatus of claim 16, wherein each candidate path in the set of candidate path is expressed in terms of a set of invariant coordinates.

19. The apparatus of claim 16, wherein to derive the first and second sets of probabilities, the instructions program the processing unit to:
  minimize an objective function based on the set of actual measurements ($\hat{\theta}$), the set of conjectured measurements ($\theta$), and the first and second sets of probabilities $\{p_k^l\}$ and $\{w_n^l\}$.

20. The apparatus of claim 19, wherein to minimize the objective function, the instructions program the processing unit to:
  (i) hold the first set of probabilities $\{p_k^l\}$ fixed and allowing one or more of the second set of probabilities $\{w_n^l\}$ to change, so as to minimize a value of the objective function.

21. The apparatus of claim 20, wherein to minimize the objective function, the instructions further program the processing unit to:
  (ii) hold the second set of probabilities $\{w_n^l\}$ fixed and allowing one or more of the first set of probabilities $\{p_k^l\}$ to change, so as to minimize a value of the objective function.

22. The apparatus of claim 21, wherein the instructions further program the processing unit to iteratively alternate between operations (i) and (ii) until:
  the first and the second set of probabilities converges; or
  a preselected number of iterations is performed.

23. The apparatus of claim 22, wherein the instructions program the processing unit either to perform operation (i) first, followed by operation (ii), in a first iteration, or to perform operation (ii) first, followed by operation (i), in the first iteration.

24. The apparatus of claim 19, wherein to minimize the objective function, the instructions program the processing unit to:
  (i) hold the first set of probabilities $\{p_k^l\}$ fixed;
  (ii) iteratively hold all but one of the second set of probabilities $\{w_n^l\}$ fixed and computing using a closed-form expression a particular probability $w_n^l$ that is not held fixed, a different $w_n^i$ not being held fixed and being computed in each iteration;

(iii) hold the second set of probabilities $\{w_n^i\}$ fixed; and (iv) iteratively holding all but one of the first set of probabilities $\{p_k^i\}$ fixed and computing using a closed-form expression a particular probability $p_k^i$ that is not held fixed, a different $p_k^i$ not being held fixed and being computed in each iteration, so as to minimize a value of the objective function.

25. The apparatus of claim 24, wherein the instructions program the processing unit either to perform operations (i) and (ii) before operations (iii) and (iv) or to perform operations (iii) and (iv) before operations (i) and (ii).

26. The apparatus of claim 16, wherein:

the plurality of objects comprises a plurality of moving objects;

for each object, the corresponding individual state represents a parametric path of movement of the object; and the set of actual measurements ($\hat{\theta}$) is indicative of respective movements of the one or more of the plurality of objects.

27. The apparatus of claim 26, wherein the instructions further program the processing unit to:

obtain for the plurality of objects, a set of initial observation pairs, each observation pair comprising an estimated initial position (r) of a moving object and an initial velocity (v) of the moving object, the association between the pairs and the plurality of objects being unknown; and generate the set of candidate paths ($\{q_k\}$) by applying a Kalman filter to the set of initial observation pairs.

28. The apparatus of claim 27, wherein the instructions further program the processing unit to:

cluster the set of actual measurements ($\hat{\theta}$) to determine an upper bound on the number of objects; and generate the set of candidate paths ($\{q_k\}$) comprises sequentially applying the Kalman filter to each cluster along with the set of initial observation pairs.

29. The apparatus of claim 16, wherein a measurement in the set of actual measurements ($\hat{\theta}$) comprises one or more of: a range of an object from a sensor, a rate of change of range of an object from the sensor, an angle of an object relative to the sensor, brightness of an object, or Doppler shift associated with an object.

30. The apparatus of claim 16, further comprising:

a first sensor from the one or more sensors, the first sensor being selected from a group consisting of a radar, a lidar, an electro-optical sensor, an infra-red sensor, a Doppler radar, a double Doppler radar, or an optical sensor.

* * * * *